US012517942B2

(12) United States Patent
Shajari et al.

(10) Patent No.: US 12,517,942 B2
(45) Date of Patent: Jan. 6, 2026

(54) DATASET CLUSTERING AND EVALUATION

(71) Applicant: Microsoft Technology Licensing, LLC, Redmond, WA (US)

(72) Inventors: Seyedeh Hoda Shajari, Redmond, WA (US); Julia S. McAnallen, Seattle, WA (US); David B. Levitan, Bothell, WA (US); Girish Kumar, Santa Clara, CA (US); Jiantao Pan, Lynnwood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/616,091

(22) Filed: Mar. 25, 2024

(65) Prior Publication Data

US 2025/0298834 A1    Sep. 25, 2025

(51) Int. Cl.
*G06F 17/00* (2019.01)
*G06F 16/355* (2025.01)
*G06F 16/383* (2019.01)

(52) U.S. Cl.
CPC .......... *G06F 16/355* (2019.01); *G06F 16/383* (2019.01)

(58) Field of Classification Search
CPC .............................. G06F 16/355; G06F 16/383
See application file for complete search history.

(56) References Cited

U.S. PATENT DOCUMENTS

| 2019/0205322 | A1* | 7/2019 | Dobrynin | ............... | G06F 16/35 |
| 2021/0365873 | A1 | 11/2021 | Zweig | | |
| 2024/0012842 | A1* | 1/2024 | Kislal | ................. | G06F 16/345 |

OTHER PUBLICATIONS

Xiaoyong Liu and W. Bruce Croft. Cluster-based retrieval using language models. In Proceedings of the 27th annual international ACM SIGIR conference on Research and development in information retrieval. Association for Computing Machinery, 186-193. <https://doi.org/10.1145/1008992.1009026> (Year: 2004).*

Xin Liu et al., Document clustering with cluster refinement and model selection capabilities. In Proceedings of the 25th annual international ACM SIGIR conference on Research and development in information retrieval. Association for Computing Machinery, 191-198, <https://doi.org/10.1145/564376.564411> (Year: 2002).*

"Add text-clustering-embedding-vs-prompting", accessed on link https://github.com/intellectronica/text-clustering-embedding-vs-prompting/blob/main/text-clustering-embedding-vs-prompting.ipynb, Aug. 22, 2023, retrieved on Aug. 16, 2024, 6 pages.

(Continued)

*Primary Examiner* — Greta L Robinson
(74) *Attorney, Agent, or Firm* — Foley IP Law, PLLC

(57) ABSTRACT

Improved solutions for dataset clustering and evaluation are disclosed. Examples cluster a set of documents into set of clusters using a language model, in an iterative process. In second and later clustering tasks, the current cluster titles and descriptions are provided in the language model prompt, to avoid near-duplications. Upon determining that the set of clusters is sufficiently complete and representative of the set of documents, the tasking switches to classification of the set of documents into the set of clusters using a language model. Classification continues until a sufficient percentage of the set of documents is classified. Some examples use batching, to avoid overloading the language model(s). In some examples, different language models are used for clustering and classification. Some examples use intruder detection to determine the quality of the clustering. This process provides superior performance on classifying documents having little configuration control, such as website feedback from consumers.

20 Claims, 11 Drawing Sheets

(56) References Cited

OTHER PUBLICATIONS

"Text Classification", accessed on link: https://web.archive.org/web/20231003141035/https://docs.rungalileo.io/galileo/nlp-studio/text-classification, Oct. 3, 2023, 6 pages.
Blei, et al., "Latent Dirichlet Allocation", Advances in neural information processing systems 14, Advances in neural information processing systems, vol. 14, 2021, 8 pages.
Chang, et al., "Reading Tea Leaves: How Humans Interpret Topic Models", Advances in neural information processing systems, vol. 22, 2009, 9 pages.
Chembu, et al., "A Generalized Framework for Predictive Clustering and Optimization", arXiv:2305.04364, May 7, 2023, 23 pages.
Grootendorst, Maarten., "BERTopic: Neural topic modeling with a class-based TF-IDF procedure", arXiv:2203.05794, Mar. 11, 2022, 10 pages.
LangChain., "LLM Caching integrations", accessed on link https://web.archive.org/web/20230921131952/https:/python.langchain.com/docs/integrations/llms/llm_caching, Sep. 21, 2023, 14 pages.
MacQueen, James., "Some methods for classification and analysis of multivariate observations", In Proceedings of the fifth Berkeley symposium on mathematical statistics and probability, vol. 1, Issue No. 14, 1967, pp. 281-297.
Sturrock, et al., "Machine Learning Pipeline for Exoplanet Classification", SMU Data Science Review, vol. 2, Issue No. 1, 2019, 29 pages.
Viswanathan, et al., "Large Language Models Enable Few-Shot Clustering", arXiv:2307.00524, Jul. 2, 2023, 12 pages.

* cited by examiner

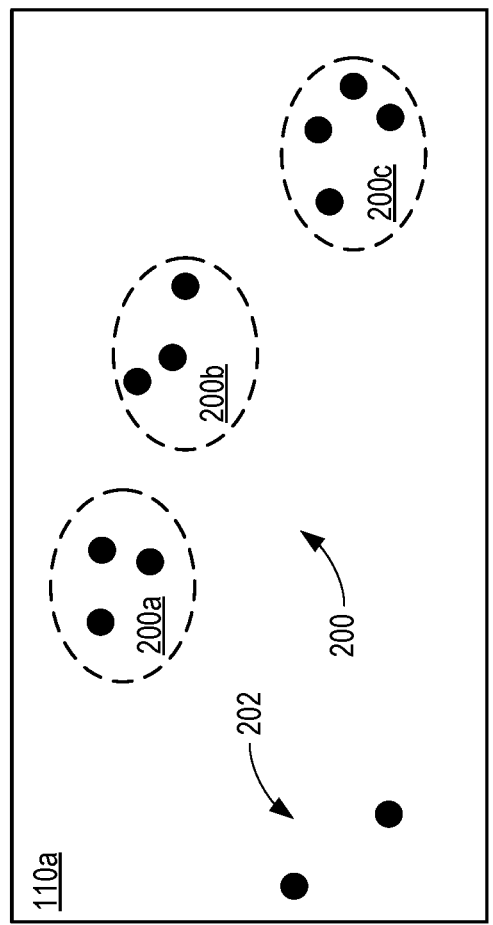

FIG. 3

```
<|im_start|>system                    ← 302                                    300
INSTRUCTIONS
Given a list of feedback gathered from the user, we want to cluster the feedbacks such that
each cluster represents something meaningful. These clusters together with their
corresponding titles and short descriptions will enable us to get quick overview of all
feedbacks within a cluster. We will approach the clustering iteratively where each time we
give you a small subset of the feedbacks for clustering. At the next iteration, you may use
some of the clusters which were generated in previous iteration or add new clusters. One
feedback may be associated to multiple clusters.
                            ← 304
RESTRICTIONS
We must follow the below mentioned restrictions when clustering:
- Do not create very broad clusters
- Do not cluster based on sentiment of the feedback
- Maximum 10 clusters        ← 306
- A feedback may belong to more than one cluster    ← 308
- Output must be in JSON format
                            ← 312
Previous Iteration Clusters
Previous iteration cluster titles and short description are as follows:
```json[{"title": "Technical Queries", "description": "Cluster for technical queries related to
science, technology, and computers."}, {"title": "Historical Questions", "description": "Cluster
for questions related to history and mythology."}, {"title": "Personal Life", "description":
"Cluster for questions related to personal life and experiences."}, {"title": "Entertainment",
"description": "Cluster for questions related to entertainment and media."}, {"title": "Health
and Medical", "description": "Cluster for questions related to health and medical issues."},
{"title": "Sports", "description": "Cluster for questions related to sports."}, {"title": "Religion and
Beliefs", "description": "Cluster for questions related to religion and beliefs."}]```
<|im_end|>

<|im_start|>user           ← 314
DOCUMENT
Each line below represents one customer feedback:        ← 110a
 1. Unintuitive design
 2. The new app roll out is a disaster. I can't even access my account anymore.
 3. I really don't see the point in having these HR seminars. They're always the same and
nothing changes afterwards. 30. interesting
<|im_end|>

<|im_start|>assistant      ← 316
CLUSTERS
The new and previously used clusters for above feedbacks along with their title, description,
and corresponding feedback numbers are as follows:
```json
```

FIG. 4

```
[                                                                    400
 {                  ← 402
  "title": "Technical Issues",              ← 404
  "description": "Feedbacks related to technical issues with software, app, or system",    ⎫
  "feedbacks": [1, 10, 15, 27, 32, 60, 86, 96]                                              ⎬ 200a
 },                              ← 406                                                      ⎭
 {
  "title": "Training",
  "description": "Feedbacks related to training and development programs",
  "feedbacks": [2, 3, 5, 7, 13, 35, 36, 37, 45, 65, 73, 83, 90, 94]
 },
 {
  "title": "Customer Service",
  "description": "Feedbacks related to customer service experience",
  "feedbacks": [4, 8, 9, 28, 33, 34, 46, 48, 52, 58, 81, 85, 88]
 }, {
  "title": "Event Experience",
  "description": "Feedbacks related to event experience including conferences, workshops, and tours",
  "feedbacks": [21, 22, 41, 53, 77, 78, 91, 92, 84]
 },
 {
  "title": "Management",
  "description": "Feedbacks related to management and leadership",
  "feedbacks": [14, 24, 64, 98]
 }
]
```<|im_end|>
```

(406 indicator at top right)

FIG. 5

```
<|im_start|>system                    ← 502                                    500
INSTRUCTIONS
You are an expert in classification and categorization of user feedback. You are given a list of
categories, where each category has id, title and description. You want to use it to classify
given feedbacks into these categories. **Avoid classifying a feedback into the Miscellaneous
category**.

Categories                ← 504
The id, titles and short description of the categories are as follows:              ← 200
```json[{"title": "Technical Queries", "description": "Cluster for technical queries related to
science, technology, and computers.", "id": 1}, {"title": "Historical Questions", "description":
"Cluster for questions related to history and mythology.", "id": 2}, {"title": "Personal Life",
"description": "Cluster for questions related to personal life and experiences.", "id": 5}, {"title":
"Entertainment", "description": "Cluster for questions related to entertainment and media.",
"id": 4}, {"title": "Health and Medical", "description": "Cluster for questions related to health
and medical issues.", "id": 5}, {"title": "Sports", "description": "Cluster for questions related to
sports.", "id": 6}, {"title": "Religion and Beliefs", "description": "Cluster for questions related to
religion and beliefs.", "id": 7}, {"title": "Building and Construction", "description": "Cluster for
queries related to building and construction permits.", "id": 8}, {"title": "Computer and
Technology", "description": "Cluster for queries related to computer and technology.", "id": 9},
{"title": "Email and Contact Information", "description": "Cluster for queries related to finding
email and contact information of people.", "id": 10}]```               ← 404
<|im_end|>

<|im_start|>user       ← 506
DOCUMENT
Each line below represents one customer feedback:
1. Unintuitive design
 2. The new app roll out is a disaster. I can't even access my account anymore.
 5. I really don't see the point in having these HR seminars. They're always the same and
nothing changes afterwards. 50. interesting
<|im_end|>
                                      ← 508
<|im_start|>assistant
Classification result
Below is a list which has the category id along with the ids of the feedbacks categorized
within it:
```json
[{"category_id":1,"feedback_ids":[
```

FIG. 6

```
[{"category_id":1,"feedback_ids":[1,4,15,25,32,55,60,80,81,82,84,92,94]},
{"category_id":2,"feedback_ids":[21,39,50,70,73,96]},
{"category_id":3,"feedback_ids":[7,11,25,48,54,55,63,64,65,77,83,90,91]},
{"category_id":4,"feedback_ids":[4,17,29,40,75,86]},
{"category_id":5,"feedback_ids":[5,38,58,69,73,79]},
{"category_id":6,"feedback_ids":[6,62,72]},
{"category_id":7,"feedback_ids":[3,13,27,31,41,42,47,53,57,69,77,95,100]},
{"category_id":8,"feedback_ids":[2,11,35,46,66,71,85]},
{"category_id":9,"feedback_ids":[8,9,39,80,97]},
{"category_id":10,"feedback_ids":[10,12,14,16,18,19,20,22,23,24,26,28,30,33,34,36,37,43,44
,45,49,51,52,56,59,61,67,68,74,76,78,87,88,89,93,98,99]}]
```<|im_end|> ent
DATASET CLUSTERING AND EVALUATION

BACKGROUND

Language models, such as large language models (LLMs), are a form of artificial intelligence (AI), within a set of machine learning (ML) models that may be used in various language-intensive tasks, such as clustering of datasets. Clustering involves grouping similar data points together based on their characteristics or attributes. The goal of clustering is to identify patterns or relationships within a dataset that may not be immediately apparent, and to group similar data points together to better understand the underlying structure of data. The classical approaches for clustering tend to generate poor solutions where the clusters are not cohesive, and require a separate algorithm or approach for generating cluster titles. Further, assigned cluster titles often do not match or describe cluster content, and the performance of traditional ML algorithms also usually declines with smaller datasets (e.g., less than 1000 data points) while leaving many data points un-clustered.

SUMMARY

The disclosed examples are described in detail below with reference to the accompanying drawing figures listed below. The following summary is provided to illustrate some examples disclosed herein.

Example solutions for dataset clustering and evaluation include: clustering at least a portion of a set of documents into a plurality of clusters using a first language model with a first clustering prompt; determining that the plurality of clusters meets clustering stopping criteria; based on at least determining that the plurality of clusters meets clustering stopping criteria, classifying the set of documents into classified documents according to the plurality of clusters using a second language model with a classification prompt; and generating a classification report identifying which documents are classified into which clusters of the plurality of clusters.

BRIEF DESCRIPTION OF THE DRAWINGS

The disclosed examples are described in detail below with reference to the accompanying drawing figures listed below:

FIG. 2 illustrates a notional example of clustering, as performed by examples of the architecture of FIG. 1;

FIG. 3 illustrates an exemplary clustering prompt, as may be generated by examples of the architecture of FIG. 1;

FIG. 4 illustrates an exemplary clustering report, as may be generated by examples of the architecture of FIG. 1;

FIG. 5 illustrates an exemplary classification prompt, as may be generated by examples of the architecture of FIG. 1;

FIG. 6 illustrates an exemplary classification report, as may be generated by examples of the architecture of FIG. 1;

Corresponding reference characters indicate corresponding parts throughout the drawings.

DETAILED DESCRIPTION

Improved solutions for dataset clustering and evaluation are disclosed. Examples cluster a set of documents into a set of clusters (topics) using a language model, in an iterative process. In second and later clustering tasks, the titles and descriptions of the current set of clusters are provided in the language model prompt, to avoid near-duplications. Upon determining that the set of clusters is sufficiently complete and representative of the set of documents, the tasking switches to classification of the set of documents into the set of clusters using a language model. Classification continues until a sufficient percentage of the set of documents is classified. Some examples use batching, to avoid overloading the language model(s). In some examples, different language models are used for clustering and classification. Some examples use intruder detection to determine the quality of the clustering.

Aspects of the disclosure solve multiple problems that are necessarily rooted in computer technology and further the art of language processing, by leveraging the power of multimodal models (MMs, including large language models (LLMs)) for clustering and classification tasks by selecting the optimal task in each step of the process and using prompt engineering to provide the MMs with the corresponding context and instructions.

This enables superior performance for clustering documents that have little quality control, configuration control, and may have an almost random set of topics, such as consumer feedback comments collected by a website. Techniques disclosed herein efficiently leverage the high performance of LLM-based in understanding text and finding similarities and dissimilarities. The advantageous performance of disclosed solutions is accomplished, at least in part by, based on at least determining that a plurality of clusters meets clustering stopping criteria, classifying a set of documents into classified documents according to the plurality of clusters using a language model with a classification prompt. Further advantages include: a higher percentage of documents classified, high quality clusters (topics), fluent topic titles; no reliance on keywords or vocabulary in the set of documents (i.e., operable on largely uncontrolled input), applicability to small datasets (i.e., few documents), and the ability to have overlapping and hierarchical clustering, so that a document may be associated with multiple topics.

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

Figure 1:
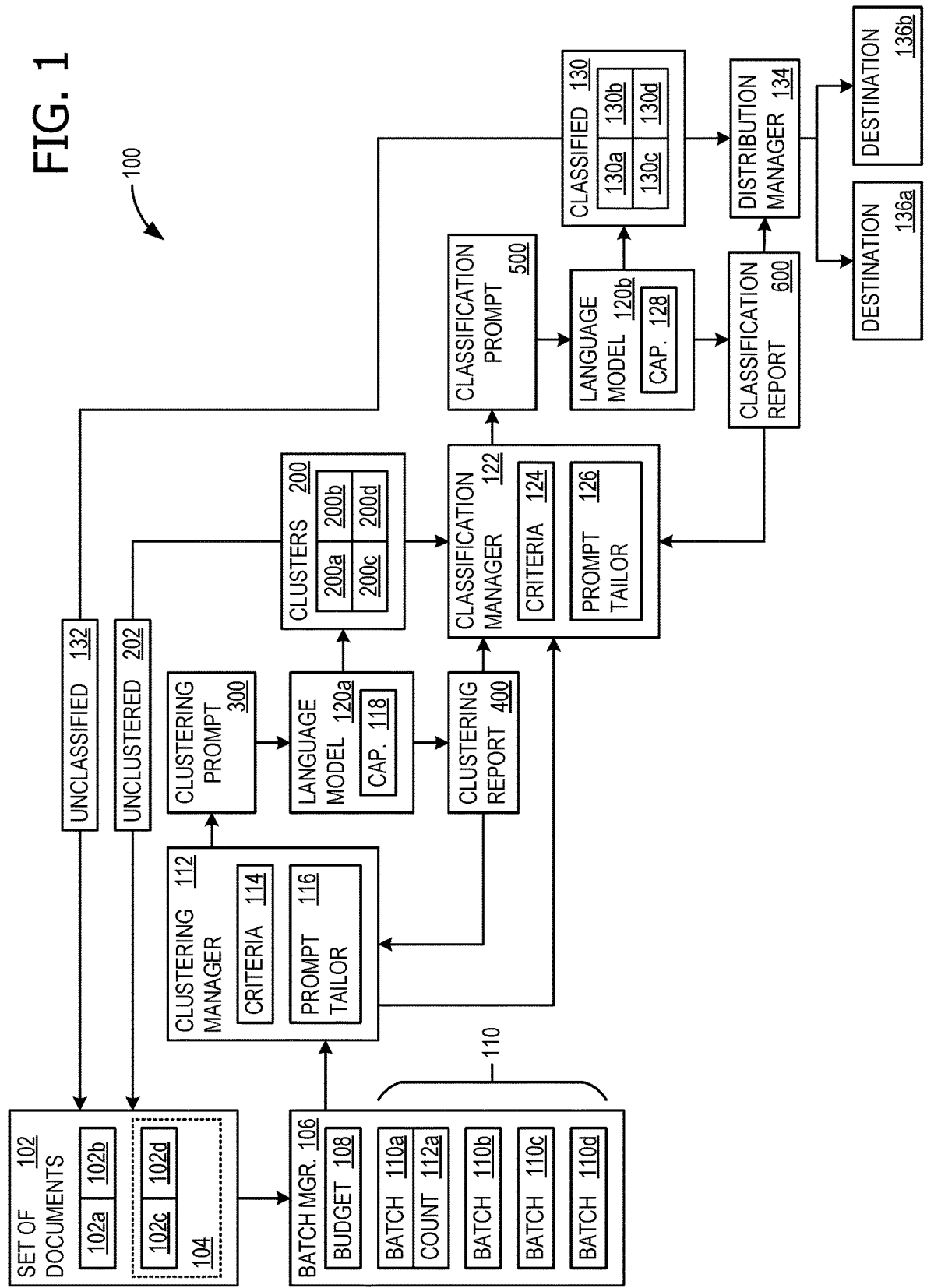
FIG. 1 illustrates an example architecture that advantageously performs dataset clustering and evaluation.

FIG. 1 illustrates an example architecture 100 that advantageously performs dataset clustering and evaluation for a set of documents 102 that includes documents 102a-102d. In some examples, set of documents 102 comprises a plurality of website feedback documents. In some examples, set of documents 102 is processed in batches, and a pool of documents 104 comprises those documents of set of documents 102 that are still awaiting processing. Initially, pool of documents 104 may include all of set of documents 102, and pool of documents 104 shrinks as documents are processed. For example, documents 102a and 102b are shown as having already been processed, whereas documents 102c and 102d are still within pool of documents 104 awaiting processing.

When set of documents 102 is large enough that attempting to cluster or classify the entirety of set of documents 102 all at once would overload the language model(s) being used, batch manager 106 batches set of documents 102 into batches of documents 110. As illustrated, a language model 120a is used for clustering and a language model 120b is used for classification. In some examples, a single language model is used for both clustering and classification. Language models 120a and 120b (and another language model 120c, shown in FIG. 7) may comprise an MM and/or an LLM. Example LLMs that may be used include generative pre-trained transformers (GPTs), such as GPT-3, GPT-3.5, GPT-4, and later GPTs.

Batch manager 106 identifies a context token capacity 118 of language model 120a and uses it to determine a context token budget 108 for batching, and generates batches that allow room for output results, and will not overwhelm language model 120a. During the classification phase, batch manager 106 identifies a context token capacity 128 of language model 120b and uses it to adjust context token budget 108 for batching (if necessary), so that language model 120b is not overwhelmed. This way, a clustering prompt 300, which is used to instruct language model 120a to perform clustering, will not exceed the capacity of language model 120a, and a classification prompt 500, which is used to instruct language model 120b to perform classification, will not exceed the capacity of language model 120b.

Four batches of documents are illustrated, although the number of batches may be different, in some examples. A batch 110a, which is also referred to as portion 110a of set of documents 102, is shown, along with a batch 110b, a batch 110c, and a batch 110d. In an example illustrated in FIG. 8, portion 110a and batch 110b are used for clustering. Without batching, portion 110a may be the entire group of documents used for clustering. Also illustrated is a count of context tokens 112a for portion 110a, although it should be understood that a count of context tokens also exists for other batches of documents 110, indicating the count of tokens within each of the other batches.

A clustering manager 112 manages clustering by language model 120a until clustering stopping criteria 114 is met. In some examples, clustering stopping criteria 114 comprises a threshold percentage of a current portion of set of documents 102 being clustered, such as 20 percent or 30 percent, or another percentage. In some examples, other criteria may be used, such as a maximum count of topics. Clustering manager 112 has a cluster prompt tailor 116 that tailors clustering prompt 300 for each iteration of clustering (when batching is used). An example of clustering prompt 300 is shown in FIG. 3, and described below.

Language model 120a uses clustering prompt 300 to perform clustering, generating a clustering report 400, which may be in Java script object notation (JSON) or use a similar syntax, in some examples. Clustering report 400 identifies a plurality of clusters 200, which is shown as a separate element, but is a notional construct. A representation of plurality of clusters 200 is shown in FIG. 2, and described below. In some examples, plurality of clusters 200 is hierarchical and/or permits overlap, such that a single document (e.g., document 102a) may belong to two different clusters.

In some examples, clustering prompt 300 may further specify whether plurality of clusters 200 is to be broad or narrow.

Plurality of clusters 200 is shown as having four clusters, a cluster 200a, a cluster 200b, a cluster 200c, and a cluster 200d, although it should be understood that a different count of clusters may be used in some examples. Any documents in the batch that are not clustered are within unclustered documents 202, and returned to pool of documents 104. When clustering is iterated, a different clustering prompt 300 is used each iteration, for example a clustering prompt 300a for the first iteration (portion 110a), a clustering prompt 300b for the second iteration (batch 110b), and so on. With each iteration of clustering, plurality of clusters 200 may grow.

Upon plurality of clusters 200 meeting clustering stopping criteria 114, clustering manager 112 alerts a classification manager 122 to begin classification using plurality of clusters 200. Classification manager 122 manages classification by language model 120b until classification stopping criteria 124 is met. In some examples, classification stopping criteria 124 comprises a threshold percentage of set of documents 102 being classified, such as 80 percent or 90 percent, or another percentage. In some examples, other criteria may be used, such as a maximum count of classified documents. Classification manager 122 has a classification prompt tailor 126 that tailors classification prompt 500 for each iteration of classification (when batching is used). An example of classification prompt 500 is shown in FIG. 5 and described below.

Language model 120b uses classification prompt 500 to perform classification, generating a classification report 600, which may be in JSON or use a similar syntax, in some examples. Classification report 600 identifies a classified documents 130, which is shown as a separate element, but is a notional construct. Classified documents 130 includes a classified document 130a, a classified document 130b, a classified document 130c, and a classified document 130d, although it should be understood that a different count of classified documents 130 may be used in some examples. Classified documents 130a-130c represent any of documents 102a-102d. Any documents in the current batch that are not (yet) placed into classified documents 130 are instead within unclassified documents 132, and returned to pool of documents 104. When classification is iterated, classification prompt 500 is updated with the current batch of documents, but retains plurality of clusters 200. With each iteration of classification, classified documents 130 may grow.

There are multiple practical uses for document classification. For example, different groups may perform different tasks with different documents, based on the documents' topics. Thus, there is value in automatically distributing documents to differing locations, based on the documents' topics. A document distribution manager 134 uses classification report 600 to identify which of differing storage locations, a storage location 136a and a storage location 136b should receive which of classified documents 130, so that users at those locations receive only the documents relevant to them for further proccing or action, but are not inundated with large numbers of irrelevant documents. Additionally, in some examples, different versions of classification report 600 are monitored over time to identify the emergence of new topics, which may indicate a new problem with some system that requires being addressed.

Figure 9:
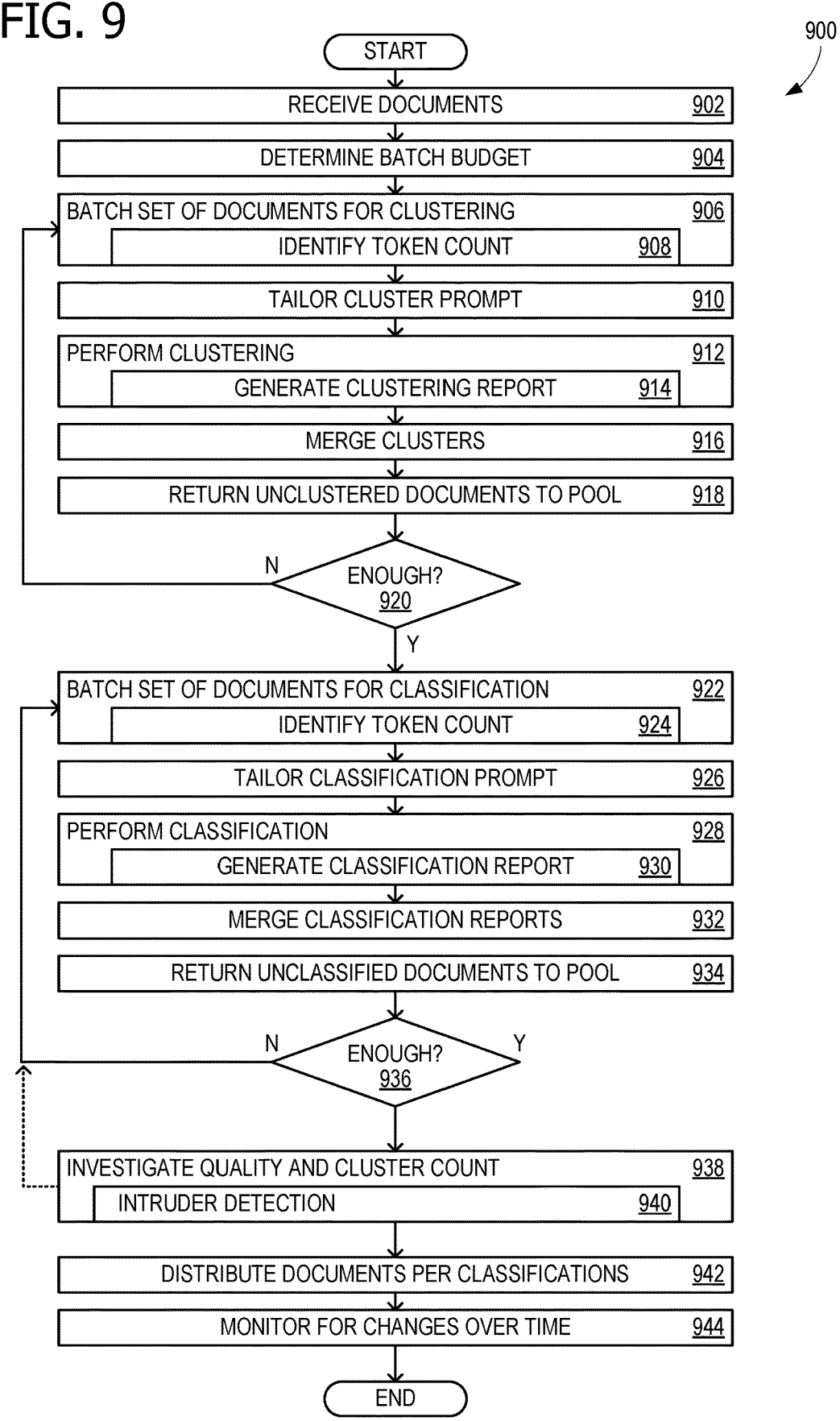
FIGS. 9 and 10 show flowcharts illustrating exemplary operations that may be performed when using example architectures, such as the architecture of FIG. 1.

FIG. 2 illustrates a notional example of clustering, as performed by architecture 100. Portion 110a of set of documents 102 is shown as being clustered into three clusters: cluster 200a, cluster 200b, and cluster 200c. In this first round (iteration) of clustering plurality of clusters 200 has only these three clusters. Cluster 200d will be discovered and added to plurality of clusters 200 in a later iteration of clustering (as shown in FIG. 9 and described below). Unclustered documents 202 do not belong to any of clusters 200a-200c.

Figure 8:
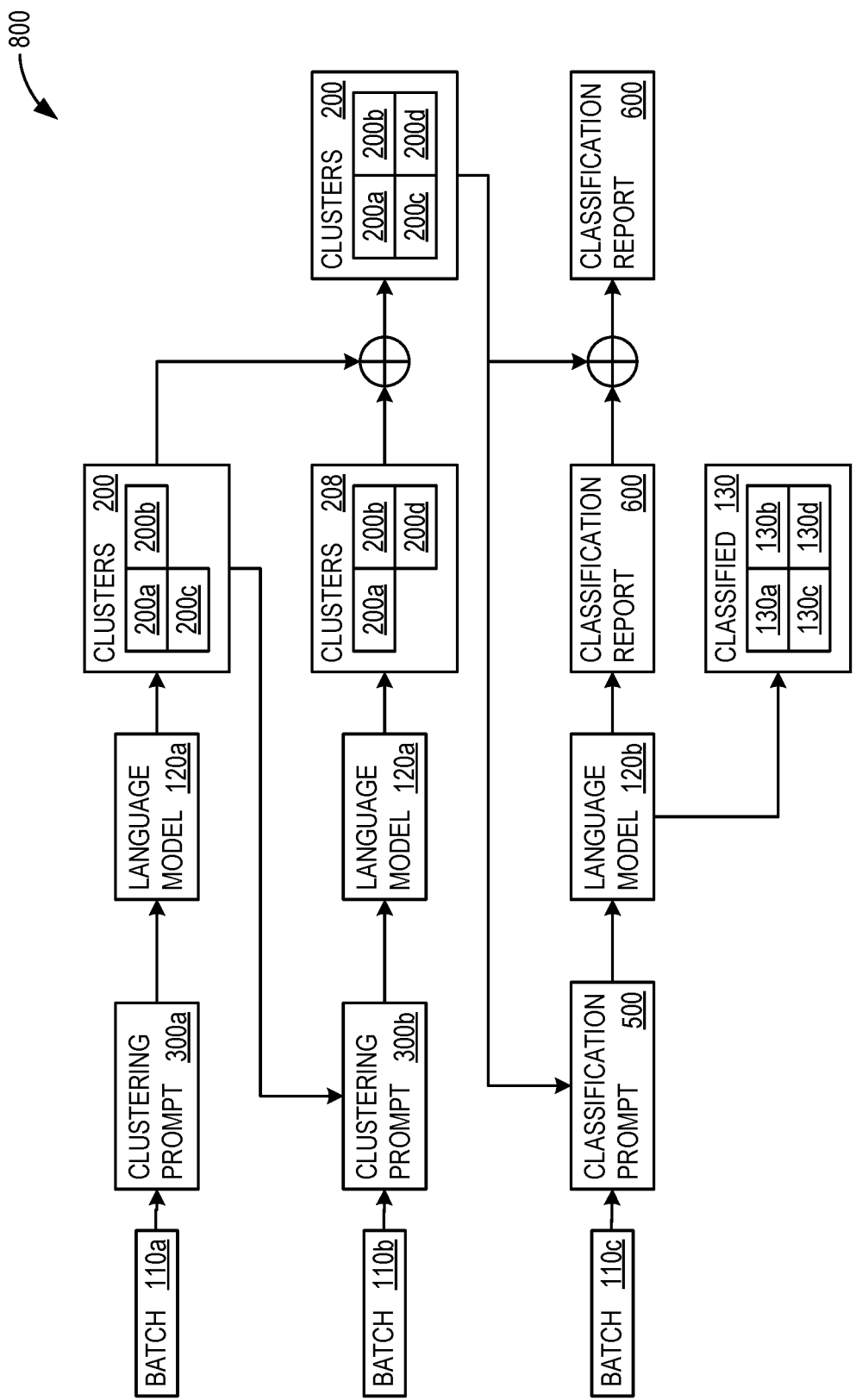
FIG. 8 illustrates an exemplary workflow that may be performed by examples of the architecture of FIG. 1.

FIG. 3 illustrates an example of clustering prompt 300. Clustering prompt 300 has new manifest version per iteration of clustering, as clustering prompt 300a in the first iteration and as clustering prompt 300b in the second iteration. This is shown in FIG. 8, and described in further detail below. Clustering prompt 300 has an instruction portion 302 that instructs language model 120a to perform clustering, and also a restrictions portion 304 that includes a limit on a count of clusters 306 (shown as ten). Restrictions portion 304 permits overlapping clusters with an instruction 308 (" . . . may belong to more than one cluster"), and specifies JSON output.

Clustering prompt 300 also has a listing of previously-identified clusters 312, although since clustering prompt 300a is for the first iteration, clustering prompt 300a may not have listing of previously-identified clusters 312. A documents section 314 of clustering prompt 300 includes the content of the documents in the current batch, which for clustering prompt 300a is portion 110a. Clustering prompt 300b will have another portion (batch 110b) of set of documents 102 in clustering prompt 300a, but contents of the documents in batch 110b become documents section 314 in clustering prompt 300. An assistant section 316 includes text for an automated language model assistant to use.

FIG. 4 illustrates an example of clustering report 400. Clustering report 400 shows the text associated with cluster 200a (or another cluster), and identifies each cluster of plurality of clusters 200 (at least the clusters identified in the current batch iteration). In some examples, there is a cluster identification (ID) number (as shown in FIG. 6), whereas in some examples, a cluster title 402 is used as the identification for each cluster, at this stage. A cluster description 404 is also provided for each cluster. A document ID list 406 identifies which documents of set of documents 102 is in each cluster. In some examples, the index number, assigned to each document of set of documents 102 is used in each document ID list 406. Although cluster title 402, cluster description 404, and document ID list 406 are indicated for cluster 200a in FIG. 4, it should be understood that each of the other clusters has the equivalent components.

FIG. 5 illustrates an example of classification prompt 500. Classification prompt 500 has an instruction portion 502 that instructs language model 120b to perform classification, and also a categories portion 504 that lists cluster title 402 and cluster description 404 for each cluster in plurality of clusters 200. A cluster description 404 is indicated for the final cluster listed, for identification. A documents section 506 of classification prompt 500 includes the content of the documents in the current batch. Classification manager 122 tailors classification prompt 500 for each iteration of classification, changing out the documents in documents section 506 to hold the contents of the documents in the current batch. However, instruction portion 502 and categories portion 504 may remain the same in each iteration of classification. An assistant section 508 includes text for an automated language model assistant to use.

Figure 7:
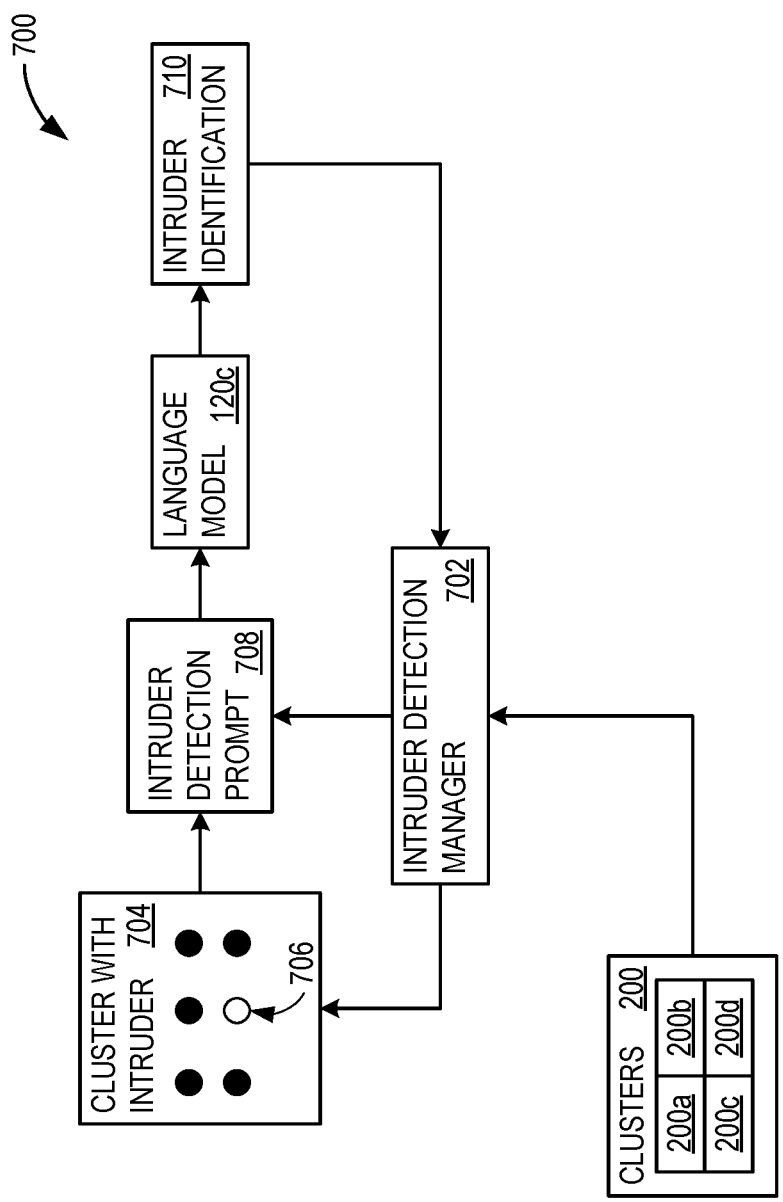
FIG. 7 illustrates an exemplary intruder detection process that may be performed by examples of the architecture of FIG. 1.

FIG. 6 illustrates an example of classification report 600. Classification report 600 has a cluster identification 602 and a document ID list 604 identifies which documents of classified documents 130 is classified into each cluster. In some examples, classification report 600 has cluster title 402 for each cluster in addition to, or instead of, cluster identification 602. FIG. 7 illustrates an exemplary intruder detection process 700 to measure the quality of the clustering results. In some examples, intruder detection process 700 is performed as a final quality check after the final set (i.e., final version) of plurality of clusters 200 is obtained. Intruder detection process 700 uses a language model 120c, which may be the same as language model 120a and/or language model 120b. An intruder detection manager 702 forms a test cluster 704 using documents from one cluster of plurality of clusters 200, plus an intruder 706 from a different cluster. An intruder detection prompt 708 instructs language model 120c to perform intruder detection on test cluster 704. Language model 120c outputs an intruder identification 710, which is correct if it identifies intruder 706. In some examples, the intruder detection is performed for only a single intruder detection task at a time, to prevent language model 120c from learning.

When multiple intruder identifications 710 are performed, the higher the number of successful detections of intruder 706, the better the quality of the clustering, in general. Some examples use an average mean and weighted average mean as overall quality scores across the clusters.

FIG. 8 illustrates an exemplary workflow 800 that may be performed by architecture 100. Portion 110a (shown as batch 110a) is used to tailor documents section 314 of clustering prompt 300a, and language model 120a produces plurality of clusters 200 having (in this first iteration) only clusters 200a-200c. Clusters 200a-200c are entered into listing of previously-identified clusters 312 of clustering prompt 300b, along with contents of documents from batch 110b being moved into documents section 314. Language model 120a then produces new plurality of clusters 208 having cluster 200a, cluster 200b, and cluster 200d. New plurality of clusters 208 and plurality of clusters 200 (from the prior iteration) are merged, so that plurality of clusters 200 now has cluster 200a, cluster 200b, cluster 200c, and cluster 200d.

Clusters 200a-200d are entered into categories portion 504 of classification prompt 500, along with contents of documents from batch 110c being moved into documents section 506. Language model 120b then produces classification report 600 identifying classified documents 130. In some examples, classification is iterated, and classified documents 130 grows from an initially small set to a larger set by the time classification stopping criteria 124 is satisfied. Classification report 600 may grow with each iteration, merging the most recently-produced classification report 600 with the prior version of classification report 600, producing a cumulative version of classification report 600. In some examples, additional information is merged into classification report 600, for example information from plurality of clusters 200 such as cluster title 402 and/or cluster description 404.

FIG. 9 shows a flowchart 900 illustrating exemplary operations that may be performed by architecture 100. In some examples, operations described for flowchart 900 are performed by computing device 1100 of FIG. 11. Flowchart 900 commences with receiving set of documents 102 in operation 902. In some examples, set of documents 102 comprises a plurality of website feedback documents. In operation 904, batch manager 106 identifies context token budget 108 for batching, using context token capacity 118 of language model 120a and context token capacity 128 for language model 120b. In some examples, there is a separate context token budgets 108 for clustering (using context token capacity 118) and for classification (using context token capacity 128).

When set of documents 102 is large enough that context token budget 108 would be over-loaded by attempting to cluster the entirety of set of documents 102 all at once, batch manager 106 batches set of documents 102 into batches of documents 110 for clustering, in operation 906. This includes creating portion 110a of set of documents 102 as a batch. Each batch of documents comprises fewer than all documents of set of documents 102, limited in size based on at least the count of context tokens of that batch and context token budget 108. For portion 110a, this is count of context tokens 112a; other batches have their own counts. The count of context tokens of each batch of documents (e.g., count of context tokens 112a) is identified in operation 908.

In operation 910, clustering manager 112 tailors the current clustering prompt 300. In the first pass through operation 910, this is clustering prompt 300a. In some examples, each clustering prompt 300 includes limit on the count of clusters 306 allowed and the content of the current batch of documents. For clustering prompt 300a, the current batch of documents is portion 110a of set of documents 102.

Clustering is performed in operation 912. In the first pass, operation 912 clusters portion 110a of set of documents 102 into plurality of clusters 200 using language model 120a with clustering prompt 300a. In some examples, plurality of clusters 200 is hierarchical, and/or at least two clusters of plurality of clusters 200 overlap by having a common document in each of the clusters. Operation 912 includes operation 914, which generates clustering report 400 identifying each cluster of plurality of clusters 200 and, for each cluster of plurality of clusters 200, identifying cluster description 404. In some examples, clustering report 400 is in JSON and/or also identifies, for each cluster of plurality of clusters 200, cluster identification 602 or cluster title 402.

Operation 916 merges the most recently generated clusters 200 into the prior set of clusters 200 (e.g., merges new plurality of clusters 208 into plurality of clusters 200, as shown in FIG. 8). On the first iteration of operations 906-920, operation 916 is not performed (unless a default set of clusters is provided for merging). Unclustered documents 202 are moved back into pool of documents 104, from which they may later be drawn again for batching, in operation 918.

Decision operation 920 determines whether plurality of clusters 200 meets clustering stopping criteria 114 (e.g., a threshold percentage of the current batch of set of documents 102 being clustered, or the cumulative count of documents sent for clustering being clustered). In some examples, the threshold percentage is 20 percent or 30 percent. If not, flowchart 900 returns to operation 906. Operations 906-920 are iterated, using further clustering prompts that each include plurality of clusters 200 from the prior iteration of clustering, until determining that plurality of clusters 200 meets clustering stopping criteria 114.

For example, in the second pass (based on at least decision operation 920 determining that plurality of clusters 200 does not meet clustering stopping criteria 114), operation 910 tailors clustering prompt 300b to include plurality of clusters 200 generated using clustering prompt 300a. Operation 912 clusters at least another portion (batch 110b) of set of documents 102 into plurality of clusters 200 using language model 120a with clustering prompt 300b. Operation 916 merges new plurality of clusters 208 into plurality of clusters 200.

When decision operation 920 determines that plurality of clusters 200 meets clustering stopping criteria 114, flowchart 900 then moves from clustering to classification. In operation 922, set of documents 102 is batched into batches of documents 110 for classification. In some examples, batching may start where batching for clustering left off, using only documents remaining in pool of documents 104. In some examples, pool of documents 104 is reset to include all of set of documents 102 so batching starts anew. Operation 922 includes operation 924, which identifies the count of context tokens of the current batch of documents (e.g., batch 110c).

In operation 926, classification manager 122 tailors classification prompt 500 to include plurality of clusters 200 and, for each cluster of plurality of clusters 200, cluster description 404. Operation 928 classifies set of documents 102 into classified documents 130 according to plurality of clusters 200 using language model 120b with classification prompt 500. As part of operation 928, operation 930 generates classification report 600 identifying which documents of classified documents 130 are classified into which clusters of plurality of clusters 200. In some examples, classification report 600 is in JSON and/or further identifies cluster title 402 for each cluster of plurality of clusters 200.

If the classification process is performed in multiple iterations, using batches, operation 932 merges each classification report 600 with the prior classification report 600 (although not in the first iteration through operations 922-936). In some examples, this includes adding additional information, such as cluster titles into classification report 600. In operation 936 unclassified documents 132 are moved back into pool of documents 104 to be available for future batching.

Decision operation 936 determines whether classification stopping criteria 124 is met (e.g., a threshold percentage of set of documents 102 being classified). In some examples, the threshold percentage is 80 percent or 90 percent. If not, flowchart 900 returns to operation 922. Operations 922-936 are iterated, until determining that set of documents 102 meets classification stopping criteria 124. When decision operation 936 determines that set of documents 102 meets classification stopping criteria 124, clustering quality and count may be investigated in operation 938. This may include requesting an explanation for a cluster or a cluster title from language model 120a, to determine clustering quality, and/or requesting an explanation for a classification of a document from language model 120b, to determine the classification quality. If the response indicates a poor classification quality or a poor choice of topics (clustering), flowchart 900 may return to operation 906 or operation 922. In some scenarios, new clusters may be needed, new titles or descriptions for one or more cluster might be needed, or some documents may be removed from classification report 600 and reclassified.

In some examples, if the number of clusters is higher than a pre-defined threshold or if some clusters overlap significantly based on some measure, such as Intersection over Union (IoU), some of the clusters may be combined. In some examples, language model 120a performs the cluster combination and creates a new cluster title 402 and cluster description 404 that better fit the theme of the resulting combined cluster. In some examples, operation 938 further includes operation 940 that performs intruder detection for at least two clusters of plurality of clusters 200, according to intruder detection process 700 of FIG. 7.

Operation 942 moves documents of classified documents 130 into differing storage locations 136a and 136b (and/or other locations), based on at least the cluster into which each document is classified. Further topic-specific processing and actions may be performed at storage locations 136a and 136b. Operation 944 monitors classification reports 600 over time to identify emergence of new topics (i.e., new clusters). This may indicate a new issue that the user of architecture 100 needs to address. In some examples, a report of topics, flagging new or dropped topics, over time may be generated.

Figure 10:
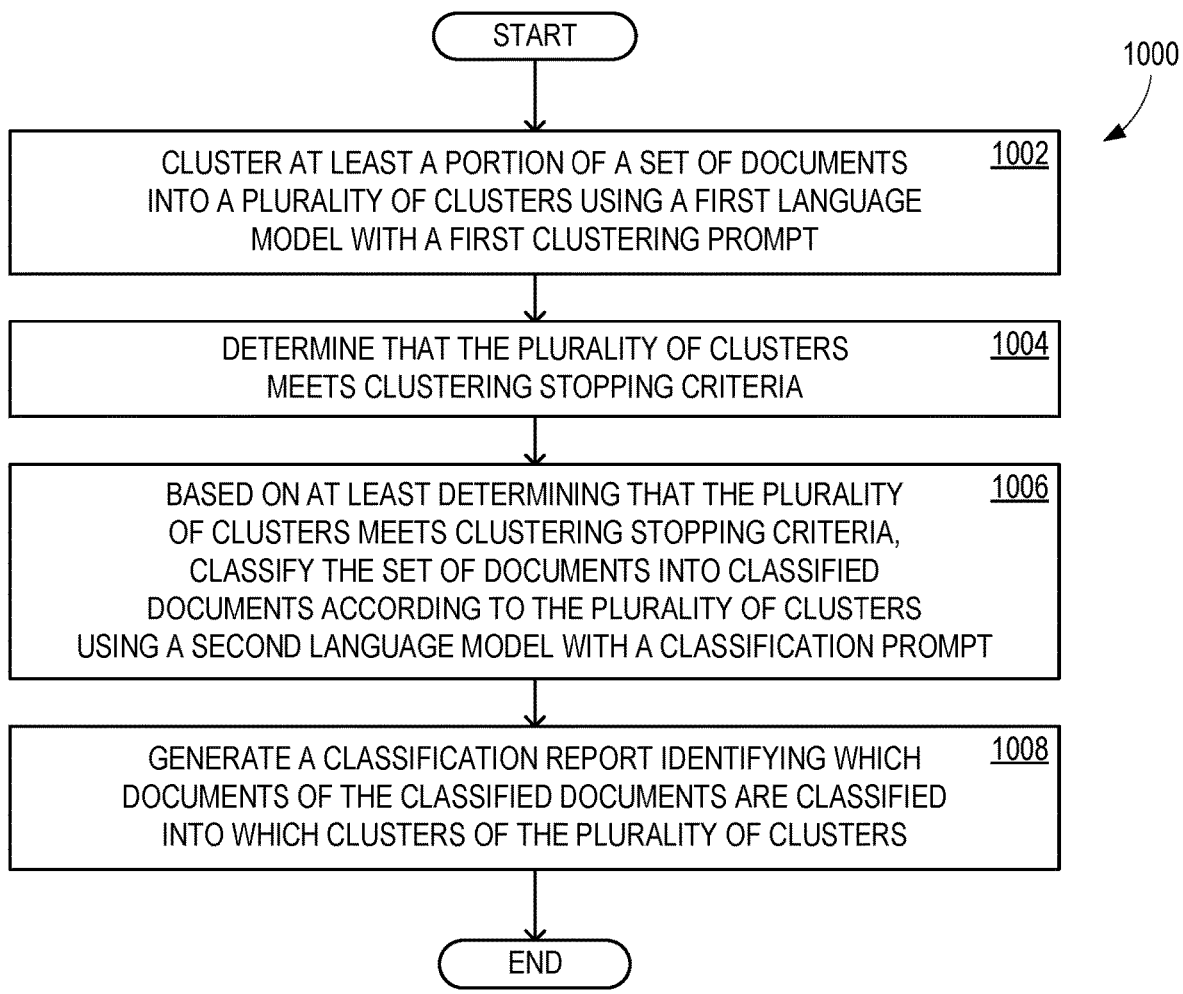

FIG. 10 shows a flowchart 1000 illustrating exemplary operations that may be performed by architecture 100. In some examples, operations described for flowchart 1000 are performed by computing device 1100 of FIG. 11. Flowchart 1000 commences with operation 1002, which includes clustering at least a portion of a set of documents into a plurality of clusters using a first language model with a first clustering prompt.

Operation 1004 includes determining that the plurality of clusters meets clustering stopping criteria. Operation 1006 includes based on at least determining that the plurality of clusters meets clustering stopping criteria, classifying the set of documents into classified documents according to the plurality of clusters using a second language model with a classification prompt. Operation 1008 includes generating a classification report identifying which documents of the classified documents are classified into which clusters of the plurality of clusters.

Additional Examples

An example system comprises: a processor; and a computer-readable medium storing instructions that are operative upon execution by the processor to: cluster at least a portion of a set of documents into a plurality of clusters using a first language model with a first clustering prompt; determine that the plurality of clusters meets clustering stopping criteria; based on at least determining that the plurality of clusters meets clustering stopping criteria, classify the set of documents into classified documents according to the plurality of clusters using a second language model with a classification prompt; and generate a classification report identifying which documents of the classified documents are classified into which clusters of the plurality of clusters.

An example computer-implemented method comprises: clustering at least a portion of a set of documents into a plurality of clusters using a first language model with a first clustering prompt; determining that the plurality of clusters meets clustering stopping criteria; based on at least determining that the plurality of clusters meets clustering stopping criteria, classifying the set of documents into classified documents according to the plurality of clusters using a second language model with a classification prompt; and generating a classification report identifying which documents of the classified documents are classified into which clusters of the plurality of clusters.

One or more example computer storage devices have computer-executable instructions stored thereon, which, on execution by a computer, cause the computer to perform operations comprising: clustering at least a portion of a set of documents into a plurality of clusters using a first language model with a first clustering prompt; determining that the plurality of clusters meets clustering stopping criteria; based on at least determining that the plurality of clusters meets clustering stopping criteria, classifying the set of documents into classified documents according to the plurality of clusters using a second language model with a classification prompt; and generating a classification report identifying which documents of the classified documents are classified into which clusters of the plurality of clusters.

Alternatively, or in addition to the other examples described herein, examples include any combination of the following:
  moving documents of the classified documents into differing storage locations based on at least the cluster into which each document is classified;
  based on at least determining that the plurality of clusters does not meet the clustering stopping criteria, tailoring a second clustering prompt to include the plurality of clusters generated using the first clustering prompt;
  clustering at least another portion of the set of documents into the plurality of clusters using the first language model with the second clustering prompt;
  generating a clustering report identifying each cluster of the plurality of clusters and, for each cluster of the plurality of clusters, identifying a cluster title and a cluster description;
  tailoring the classification prompt to include the plurality of clusters and, for each cluster of the plurality of clusters, the cluster description and the cluster description;
  classifying the set of documents into classified documents comprises batching the set of documents into batches of documents;
  each batch of documents comprises fewer than all documents of the set of documents;
  each batch of documents is limited in size based on at least a count of context tokens of the batch of documents and a context token capacity of the second language model;
  classifying the set of documents into classified documents comprises classifying the set of documents by the batches of documents, until determining that the classified documents meet classification stopping criteria;
  performing intruder detection for at least two clusters of the plurality of clusters;
  classifying the set of documents comprises classifying the set of documents based on at least determining that the intruder detection meets a performance threshold;
  the first language model and the second language model comprise a common language model;
  the clustering stopping criteria comprises a threshold percentage of a current portion of the set of documents being clustered;
  receiving the set of documents;
  the set of documents comprises a plurality of website feedback documents;
  the first language model comprises an MM;
  the first language model comprises an LLM;
  the first language model comprises a GPT model;
  the second language model comprises an MM;
  the second language model comprises an LLM;
  the second language model comprises a GPT model;
  clustering portions of the set of documents into the plurality of clusters comprises batching the set of documents into batches of documents;
  each batch of documents comprises fewer than all documents of the set of documents;
  each batch of documents is limited in size based on at least a count of context tokens of the batch of documents and a context token capacity of the first language model;
  the first clustering prompt comprises the portion of the set of documents;
  the first clustering prompt comprises a limit on a count of clusters;

clustering at least another portion of the set of documents into the plurality of clusters comprises clustering at least another portion of the set of documents into a new plurality of clusters and merging the new plurality of clusters into the plurality of clusters;

for each iteration of clustering, moving unclustered documents into the pool of documents from which a future batch of documents may be drawn;

the clustering report further identifies, for each cluster of the plurality of clusters, a cluster title;

the clustering report is in JSON;

the plurality of clusters is hierarchical;

the classification report further identifies, for each cluster of the plurality of clusters, a cluster identification or the cluster title;

determining whether the plurality of clusters meets the clustering stopping criteria;

iterating clustering further portions of the set of documents into the plurality of clusters using the first language model with further clustering prompts, each further clustering prompt including the plurality of clusters from the prior iteration of clustering, until determining that the plurality of clusters meets the clustering stopping criteria;

the threshold percentage of the current portion of the set of documents is 20 percent or 30 percent;

the intruder detection is performed for only a single intruder detection task at a time;

based on at least determining that the intruder detection does not meet the performance threshold continuing to cluster portions of the set of documents into the plurality of clusters;

for each iteration of classification, moving unclassified documents into the pool of documents from which a future batch of documents may be drawn;

the classification stopping criteria comprises the classified documents reaching a threshold percentage of the set of documents;

the threshold percentage of the set of documents is 80 percent or 90 percent;

the classification report is in JSON;

the intruder detection uses a third language model;

the third language model comprises the first language model and/or the second language model;

requesting, from the first language model, an explanation for a cluster or a cluster title;

requesting, from the second language model, an explanation for a classification of a document;

at least two clusters of the plurality of clusters overlap; and monitoring classification reports over time to identify emergence of new clusters.

While the aspects of the disclosure have been described in terms of various examples with their associated operations, a person skilled in the art would appreciate that a combination of operations from any number of different examples is also within scope of the aspects of the disclosure.

Example Operating Environment

Figure 11:
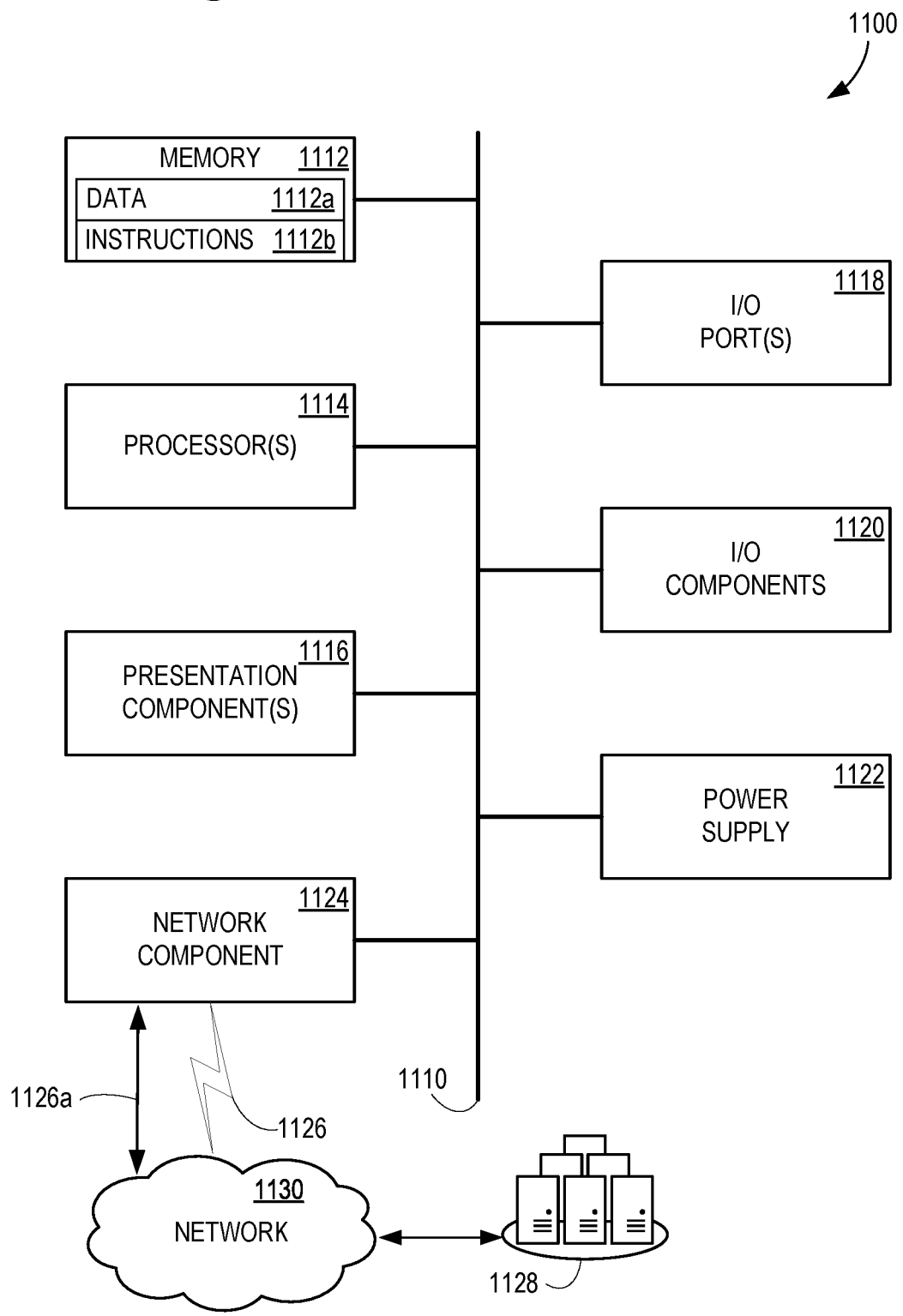
FIG. 11 shows a block diagram of an example computing device suitable for implementing some of the various examples disclosed herein.

FIG. 11 is a block diagram of an example computing device 1100 (e.g., a computer storage device) for implementing aspects disclosed herein, and is designated generally as computing device 1100. In some examples, one or more computing devices 1100 are provided for an on-premises computing solution. In some examples, one or more computing devices 1100 are provided as a cloud computing solution. In some examples, a combination of on-premises and cloud computing solutions are used. Computing device 1100 is but one example of a suitable computing environment and is not intended to suggest any limitation as to the scope of use or functionality of the examples disclosed herein, whether used singly or as part of a larger set.

Neither should computing device 1100 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1100 includes a bus 1110 that directly or indirectly couples the following devices: computer storage memory 1112, one or more processors 1114, one or more presentation components 1116, input/output (I/O) ports 1118, I/O components 1120, a power supply 1122, and a network component 1124. While computing device 1100 is depicted as a seemingly single device, multiple computing devices 1100 may work together and share the depicted device resources. For example, memory 1112 may be distributed across multiple devices, and processor(s) 1114 may be housed with different devices.

Bus 1110 represents what may be one or more buses (such as an address bus, data bus, or a combination thereof). Although the various blocks of FIG. 11 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 11 and the references herein to a "computing device." Memory 1112 may take the form of the computer storage media referenced below and operatively provide storage of computer-readable instructions, data structures, program modules and other data for the computing device 1100. In some examples, memory 1112 stores one or more of an operating system, a universal application platform, or other program modules and program data. Memory 1112 is thus able to store and access data 1112a and instructions 1112b that are executable by processor 1114 and configured to carry out the various operations disclosed herein. Thus, computing device 1100 comprises a computer storage device having computer-executable instructions 1112b stored thereon.

In some examples, memory 1112 includes computer storage media. Memory 1112 may include any quantity of memory associated with or accessible by the computing device 1100. Memory 1112 may be internal to the computing device 1100 (as shown in FIG. 11), external to the computing device 1100 (not shown), or both (not shown). Additionally, or alternatively, the memory 1112 may be distributed across multiple computing devices 1100, for example, in a virtualized environment in which instruction processing is carried out on multiple computing devices 1100. For the purposes of this disclosure, "computer storage media," "computer storage memory," "memory," and "memory devices" are synonymous terms for the memory 1112, and none of these terms include carrier waves or propagating signaling.

Processor(s) 1114 may include any quantity of processing units that read data from various entities, such as memory 1112 or I/O components 1120. Specifically, processor(s) 1114 are programmed to execute computer-executable instructions for implementing aspects of the disclosure. The instructions may be performed by the processor, by multiple processors within the computing device 1100, or by a processor external to the client computing device 1100. In some examples, the processor(s) 1114 are programmed to execute instructions such as those illustrated in the flow charts discussed below and depicted in the accompanying drawings. Moreover, in some examples, the processor(s) 1114 represents an implementation of analog techniques to perform the operations described herein. For example, the operations may be performed by an analog client computing device 1100 and/or a digital client computing device 1100. Presentation component(s) 1116 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1100, across a wired connection, or in other ways. I/O ports 1118 allow computing device 1100 to be logically coupled to other devices including I/O components 1120, some of which may be built in. Example I/O components 1120 include, for example but without limitation, a microphone, joystick, game pad, satellite dish, scanner, printer, wireless device, etc.

Computing device 1100 may operate in a networked environment via the network component 1124 using logical connections to one or more remote computers. In some examples, the network component 1124 includes a network interface card and/or computer-executable instructions (e.g., a driver) for operating the network interface card. Communication between the computing device 1100 and other devices may occur using any protocol or mechanism over any wired or wireless connection. In some examples, network component 1124 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1124 communicates over wireless communication link 1126 and/or a wired communication link 1126a to a remote resource 1128 (e.g., a cloud resource) across network 1130. Various different examples of communication links 1126 and 1126a include a wireless connection, a wired connection, and/or a dedicated link, and in some examples, at least a portion is routed through the internet.

Although described in connection with an example computing device 1100, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:

a processor; and a computer-readable medium storing instructions that are operative upon execution by the processor to:

cluster at least a portion of a set of documents into a plurality of clusters using a first language model with a first clustering prompt;

determine that the plurality of clusters meets clustering stopping criteria, the clustering stopping criteria comprising a threshold percentage of a current portion of the set of documents being clustered, relative to a total number of documents in the set of documents;

based on at least determining that the plurality of clusters meets clustering stopping criteria, classify the set of documents into classified documents according to the plurality of clusters using a second language model with a classification prompt; and generate a classification report identifying which documents of the classified documents are classified into which clusters of the plurality of clusters.

2. The system of claim 1, wherein the instructions are further operative to:

move documents of the classified documents into differing storage locations based on at least the cluster into which each document is classified.

3. The system of claim 1, wherein the instructions are further operative to:

based on at least determining that the plurality of clusters does not meet the clustering stopping criteria, tailor a second clustering prompt to include the plurality of clusters generated using the first clustering prompt; and cluster at least another portion of the set of documents into the plurality of clusters using the first language model with the second clustering prompt.

4. The system of claim 1, wherein the instructions are further operative to:

generate a clustering report identifying each cluster of the plurality of clusters and, for each cluster of the plurality of clusters, identifying a cluster title and a cluster description; and tailor the classification prompt to include the plurality of clusters and, for each cluster of the plurality of clusters, the cluster title and the cluster description.

5. The system of claim 1, wherein classifying the set of documents into classified documents comprises:

batching the set of documents into batches of documents, each batch of documents comprising fewer than all documents of the set of documents, each batch of documents limited in size based on at least a count of context tokens of the batch of documents and a context token capacity of the second language model; and classifying the set of documents by the batches of documents, until determining that the classified documents meet classification stopping criteria.

6. The system of claim 1, wherein the instructions are further operative to:

perform intruder detection for at least two clusters of the plurality of clusters.

7. The system of claim 1, wherein the first language model and the second language model comprise a common language model.

8. A computer-implemented method comprising:

clustering at least a portion of a set of documents into a plurality of clusters using a first language model with a first clustering prompt;

determining that the plurality of clusters meets clustering stopping criteria, the clustering stopping criteria comprising a threshold percentage of a current portion of the set of documents being clustered, relative to a total number of documents in the set of documents;

based on at least determining that the plurality of clusters meets clustering stopping criteria, classifying the set of documents into classified documents according to the plurality of clusters using a second language model with a classification prompt; and generating a classification report identifying which documents of the classified documents are classified into which clusters of the plurality of clusters.

9. The computer-implemented method of claim 8, further comprising:

moving documents of the classified documents into differing storage locations based on at least the cluster into which each document is classified.

10. The computer-implemented method of claim 8, further comprising:

based on at least determining that the plurality of clusters does not meet the clustering stopping criteria, tailoring a second clustering prompt to include the plurality of clusters generated using the first clustering prompt; and clustering at least another portion of the set of documents into the plurality of clusters using the first language model with the second clustering prompt.

11. The computer-implemented method of claim 8, further comprising:

generating a clustering report identifying each cluster of the plurality of clusters and, for each cluster of the plurality of clusters, identifying a cluster title and a cluster description; and tailoring the classification prompt to include the plurality of clusters and, for each cluster of the plurality of clusters, the cluster title and the cluster description.

12. The computer-implemented method of claim 8, wherein classifying the set of documents into classified documents comprises:

batching the set of documents into batches of documents, each batch of documents comprising fewer than all documents of the set of documents, each batch of documents limited in size based on at least a count of context tokens of the batch of documents and a context token capacity of the second language model; and classifying the set of documents by the batches of documents, until determining that the classified documents meet classification stopping criteria.

13. The computer-implemented method of claim 8, further comprising:

performing intruder detection for at least two clusters of the plurality of clusters.

14. The computer-implemented method of claim 8, wherein the first language model and the second language model comprise a common language model.

15. A computer storage device having computer-executable instructions stored thereon, which, on execution by a computer, cause the computer to perform operations comprising:

clustering at least a portion of a set of documents into a plurality of clusters using a first language model with a first clustering prompt;

determining that the plurality of clusters meets clustering stopping criteria, the clustering stopping criteria comprising a threshold percentage of a current portion of the set of documents being clustered, relative to a total number of documents in the set of documents;

based on at least determining that the plurality of clusters meets clustering stopping criteria, classifying the set of documents into classified documents according to the plurality of clusters using a second language model with a classification prompt; and generating a classification report identifying which documents of the classified documents are classified into which clusters of the plurality of clusters.

16. The computer storage device of claim 15, wherein the operations further comprise:

based on at least determining that the plurality of clusters does not meet the clustering stopping criteria, tailoring a second clustering prompt to include the plurality of clusters generated using the first clustering prompt; and clustering at least another portion of the set of documents into the plurality of clusters using the first language model with the second clustering prompt.

17. The computer storage device of claim 15, wherein the operations further comprise:

generating a clustering report identifying each cluster of the plurality of clusters and, for each cluster of the plurality of clusters, identifying a cluster title and a cluster description; and tailoring the classification prompt to include the plurality of clusters and, for each cluster of the plurality of clusters, the cluster title and the cluster description.

18. The computer storage device of claim 15, wherein classifying the set of documents into classified documents comprises:

batching the set of documents into batches of documents, each batch of documents comprising fewer than all documents of the set of documents, each batch of documents limited in size based on at least a count of context tokens of the batch of documents and a context token capacity of the second language model; and classifying the set of documents by the batches of documents, until determining that the classified documents meet classification stopping criteria.

19. The computer storage device of claim 15, wherein the operations further comprise:

performing intruder detection for at least two clusters of the plurality of clusters.

20. The computer storage device of claim 15, wherein the operations further comprise:

wherein the first language model and the second language model comprise a common language model.

\* \* \* \* \*